United States Patent
Yan (10) Patent No.: US 11,623,645 B2
(45) Date of Patent: Apr. 11, 2023

(54) VEHICLE BEHAVIOR PLANNING FOR OVERTAKING VEHICLES

(71) Applicants: Denso International America, Inc., Southfield, MI (US); Denso Corporation, Aichi (JP)

(72) Inventor: Yu Yan, Pittsburgh, PA (US)

(73) Assignees: DENSO International America, Inc., Southfield, MI (US); DENSO CORPORATION, Aichi (JP)

( * ) Notice: Subject to any disclaimer, the term of this patent is extended or adjusted under 35 U.S.C. 154(b) by 44 days.

(21) Appl. No.: 17/210,842

(22) Filed: Mar. 24, 2021

(65) Prior Publication Data

US 2022/0306112 A1 Sep. 29, 2022

(51) Int. Cl.
| | | |
|---|---|---|
| B60W 30/16 | (2020.01) | |
| B60W 30/18 | (2012.01) | |
| B60W 40/04 | (2006.01) | |
| G06V 20/56 | (2022.01) | |

(52) U.S. Cl.
CPC ...... B60W 30/18163 (2013.01); B60W 30/16 (2013.01); B60W 40/04 (2013.01); G06V 20/588 (2022.01); B60W 2552/53 (2020.02); B60W 2554/4023 (2020.02); B60W 2554/80 (2020.02)

(58) Field of Classification Search
CPC .......... B60W 30/18163; B60W 30/16; B60W 40/04; B60W 2552/53; B60W 2554/4023; B60W 2554/80; G06V 20/588
USPC ........................................................ 701/41
See application file for complete search history.

(56) References Cited

U.S. PATENT DOCUMENTS

| | | | |
|---|---|---|---|
| 7,765,066 B2 | 7/2010 | Braeuchle et al. | |
| 9,746,550 B2 | 8/2017 | Nath et al. | |
| 9,761,142 B2 | 9/2017 | Pflug | |
| 10,331,142 B2 | 6/2019 | Bar-Tal et al. | |
| 10,372,131 B2 | 8/2019 | Rodriguez et al. | |
| 10,513,268 B2 | 12/2019 | Ryne et al. | |
| 2016/0185388 A1* | 6/2016 | Sim ...................... | B60W 10/04 701/41 |
| 2017/0294117 A1 | 10/2017 | Burke et al. | |
| 2018/0113450 A1 | 4/2018 | Sherony | |

(Continued)

FOREIGN PATENT DOCUMENTS

| | | |
|---|---|---|
| CN | 106874597 A | 6/2017 |
| EP | 2085279 A1 | 8/2009 |

(Continued)

*Primary Examiner* — Abby Y Lin
*Assistant Examiner* — Hossam M Abd El Latif
(74) *Attorney, Agent, or Firm* — Christopher G. Darrow; Darrow Mustafa PC (57) ABSTRACT

Systems, methods, and other embodiments described herein relate to improving vehicle behavior planning to avoid undertaking maneuvers. In one embodiment, a method includes generating a driving context from sensor data about a surrounding environment of an ego vehicle. The driving context identifying lanes of a roadway and a position of the ego vehicle in the lanes. The method includes, in response to determining that the driving context and a state of a nearby vehicle satisfy a merge threshold, generating a trajectory for the ego vehicle that avoids undertaking the nearby vehicle. The method includes controlling the ego vehicle according to the trajectory.

17 Claims, 4 Drawing Sheets

(56) References Cited

U.S. PATENT DOCUMENTS

| | | | | |
|---|---|---|---|---|
| 2018/0222422 A1* | 8/2018 | Takae | ................... | B60R 21/0134 |
| 2018/0290650 A1 | 10/2018 | Ryne et al. | | |
| 2019/0095809 A1* | 3/2019 | Hyun | ................... | B60W 40/04 |
| 2019/0385448 A1 | 12/2019 | Montemurro et al. | | |
| 2020/0139972 A1 | 5/2020 | Fujiki et al. | | |
| 2021/0269040 A1* | 9/2021 | Kurokawa | ............ | B60W 40/04 |
| 2022/0250643 A1* | 8/2022 | Larsson | ................ | B60W 50/00 |

FOREIGN PATENT DOCUMENTS

| | | |
|---|---|---|
| JP | 2017518913 A | 7/2017 |
| WO | 2008110654 A1 | 9/2008 |

* cited by examiner

VEHICLE BEHAVIOR PLANNING FOR OVERTAKING VEHICLES

TECHNICAL FIELD

The subject matter described herein relates in general to systems and methods for trajectory planning and, more particularly, to identifying a driving context associated with undertaking large vehicles and generating trajectories to permit merging and overtaking.

BACKGROUND

Undertaking maneuvers, which occur when a first vehicle passes another vehicle on an inside lane (e.g., passing a vehicle that is traveling in a passing lane), can increase the risk of accidents. In general, the increased risk may arise from the vehicle in the passing lane moving slower than traffic in the same lane, increased blind spots along a corresponding side of the vehicle being passed, a reduced tendency of drivers to expect a passing vehicle along an inside lane, and so on. In any case, this risk may be further exacerbated in circumstances where the vehicle being passed is larger, such as with a lorry or vehicle that is larger than a standard passenger vehicle. For example, box trucks, delivery trucks, dump trucks, buses, lorries, and so on all represent vehicles of greater lengths that may be associated with increased risks for undertaking maneuvers. Accordingly, in the context of vehicles that operate according to autonomous or semi-autonomous controls, unknowingly performing an undertaking maneuver can represent a significant hazard. That is, such a vehicle may proceed to perform an undertaking maneuver without recognition of the increased risk. Thus, difficulties remain with identifying and avoiding instances of undertaking maneuvers.

SUMMARY

In one embodiment, example systems and methods associated with improving vehicle behavior planning to avoid undertaking maneuvers are disclosed. As previously noted, undertaking maneuvers can represent a significant safety risk. That is, passing another vehicle on an inside lane can subject the passing vehicle to additional risks since the vehicle being passed may not be aware of the presence of the passing vehicle due to such a maneuver being uncommon and/or even illegal in some jurisdictions. Moreover, when the vehicle being passed is a lorry (i.e., semi-truck) or another large vehicle, this risk can be exacerbated because of extended blind spots and other difficulties.

Therefore, in one embodiment, a disclosed approach involves determining when an ego vehicle encounters a nearby vehicle that is traveling in a passing lane (i.e., an adjacent outside lane) and generating a trajectory that avoids an undertaking maneuver by the ego vehicle. For example, in at least one configuration, the ego vehicle acquires and analyzes sensor data to determine a driving context. The driving context generally identifies a type of roadway on which the ego vehicle is traveling (e.g., multi-lane vs. single lane), a position of the ego vehicle among lanes (e.g., passing lane, travel lane, etc.), locations of nearby vehicles, and types of the nearby vehicles (e.g., vehicle class). In further arrangements, the driving context may also identify a state of the nearby vehicles, such as whether a nearby vehicle is currently attempting a lane change as may be identified from active turn signals.

From this information, the ego vehicle can identify circumstances in which an undertaking maneuver may occur and generate a trajectory for autonomous or semi-autonomous control of the vehicle that avoids the undertaking maneuver. For example, when the ego vehicle identifies that the nearby vehicle is traveling in a passing lane on a multi-lane road when the ego vehicle is in a traveling lane (i.e., a slow lane or inside lane), and proceeding would result in an undertaking maneuver, then the ego vehicle may further consider whether to adjust a path to avoid the undertaking maneuver or to proceed. In at least one configuration, the ego vehicle considers a class of the nearby vehicle and whether the nearby vehicle is attempting a lane change by identifying whether a turn signal is active. Accordingly, if the nearby vehicle satisfies the merge threshold (e.g., is a class 4 or larger vehicle with a turn signal that is active), then the ego vehicle can generate a trajectory to provide sufficient space for the nearby vehicle to merge while also changing lanes of the ego vehicle to perform an overtaking maneuver of the nearby vehicle. In this way, the ego vehicle improves behavior planning to avoid undertaking maneuvers.

In one embodiment, a merging system is disclosed. The merging system includes one or more processors and a memory that is communicably coupled to the one or more processors. The memory stores a control module including instructions that, when executed by the one or more processors, cause the one or more processors to generate a driving context from sensor data about a surrounding environment of an ego vehicle. The driving context identifying lanes of a roadway and a position of the ego vehicle in the lanes. The control module includes instructions to, in response to determining that the driving context and a state of a nearby vehicle satisfy a merge threshold, generate a trajectory for the ego vehicle that avoids undertaking the nearby vehicle. The control module includes instructions to control the ego vehicle according to the trajectory.

In one embodiment, a non-transitory computer-readable medium is disclosed. The computer-readable medium stores instructions that, when executed by one or more processors, cause the one or more processors to perform the disclosed functions. The instructions include instructions to generate a driving context from sensor data about a surrounding environment of an ego vehicle. The driving context identifying lanes of a roadway and a position of the ego vehicle in the lanes. The instructions include instructions to in response to determining that the driving context and a state of a nearby vehicle satisfy a merge threshold, generate a trajectory for the ego vehicle that avoids undertaking the nearby vehicle. The instructions include instructions to control the ego vehicle according to the trajectory.

In one embodiment, a method is disclosed. In one embodiment, a method includes generating a driving context from sensor data about a surrounding environment of an ego vehicle. The driving context identifying lanes of a roadway and a position of the ego vehicle in the lanes. The method includes, in response to determining that the driving context and a state of a nearby vehicle satisfy a merge threshold, generating a trajectory for the ego vehicle that avoids undertaking the nearby vehicle. The method includes controlling the ego vehicle according to the trajectory.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving vehicle behavior planning to avoid undertaking maneuvers are disclosed. As previously noted, undertaking maneuvers can represent a significant safety risk. That is, passing another vehicle on an inside lane can increase risks due to blind spots, an unexpected nature of the maneuver, and so on. Moreover, when the vehicle being passed is a lorry (i.e., semi-truck) or another large vehicle, the risk can be exacerbated because of extended blind spots and other difficulties.

Therefore, in one embodiment, a disclosed approach involves determining when an ego vehicle encounters a nearby vehicle that is traveling in a passing lane (i.e., an adjacent outside lane) and generating a trajectory that avoids an undertaking maneuver by the ego vehicle. For example, in at least one configuration, the ego vehicle acquires and analyzes sensor data to determine a driving context. The driving context generally identifies a type of roadway on which the ego vehicle is traveling (e.g., multi-lane vs single lane), a position of the ego vehicle among lanes (e.g., passing lane, travel lane, etc.), locations of nearby vehicles, and types of the nearby vehicles (e.g., vehicle class). The types generally define different sizes of vehicles according to class. For example, a standard passenger car may be a class 2 vehicle, a city bus may be a class 4 vehicle, and a semi-truck (also referred to as a lorry) may be a class 8 or higher vehicle. In any case, the particular class of the vehicle can further inform the risk associated with an undertaking maneuver. Furthermore, the driving context may also identify a state of the nearby vehicles, such as whether a nearby vehicle is currently attempting a lane change as may be identified from active turn signals and a particular lane of separate nearby vehicles.

From this information, the ego vehicle can identify circumstances in which an undertaking maneuver may occur. For example, when the ego vehicle identifies that the nearby vehicle is traveling in a passing lane on a multi-lane road when the ego vehicle is in a traveling lane (i.e., a slow lane or inside lane), then the ego vehicle may further consider whether to adjust a path to avoid the undertaking maneuver or to proceed. In at least one configuration, the ego vehicle considers the class of the nearby vehicle and whether the nearby vehicle is attempting a lane change by identifying whether a turn signal is active and if the class exceeds a defined merge threshold. If the nearby vehicle satisfies the merge threshold (e.g., is a class 4 or larger vehicle with a turn signal that is active) and is actively indicating a lane change, then the ego vehicle can generate a trajectory to provide sufficient space for the nearby vehicle to merge while also changing lanes of the ego vehicle to perform an overtaking maneuver of the nearby vehicle. According to this occurrence, the ego vehicle, in at least one approach, generates the trajectory for autonomous control, semi-autonomous control, or simply guidance of a driver that avoids the undertaking maneuver. In this way, the ego vehicle improves behavior planning to avoid undertaking maneuvers.

Figure 1:
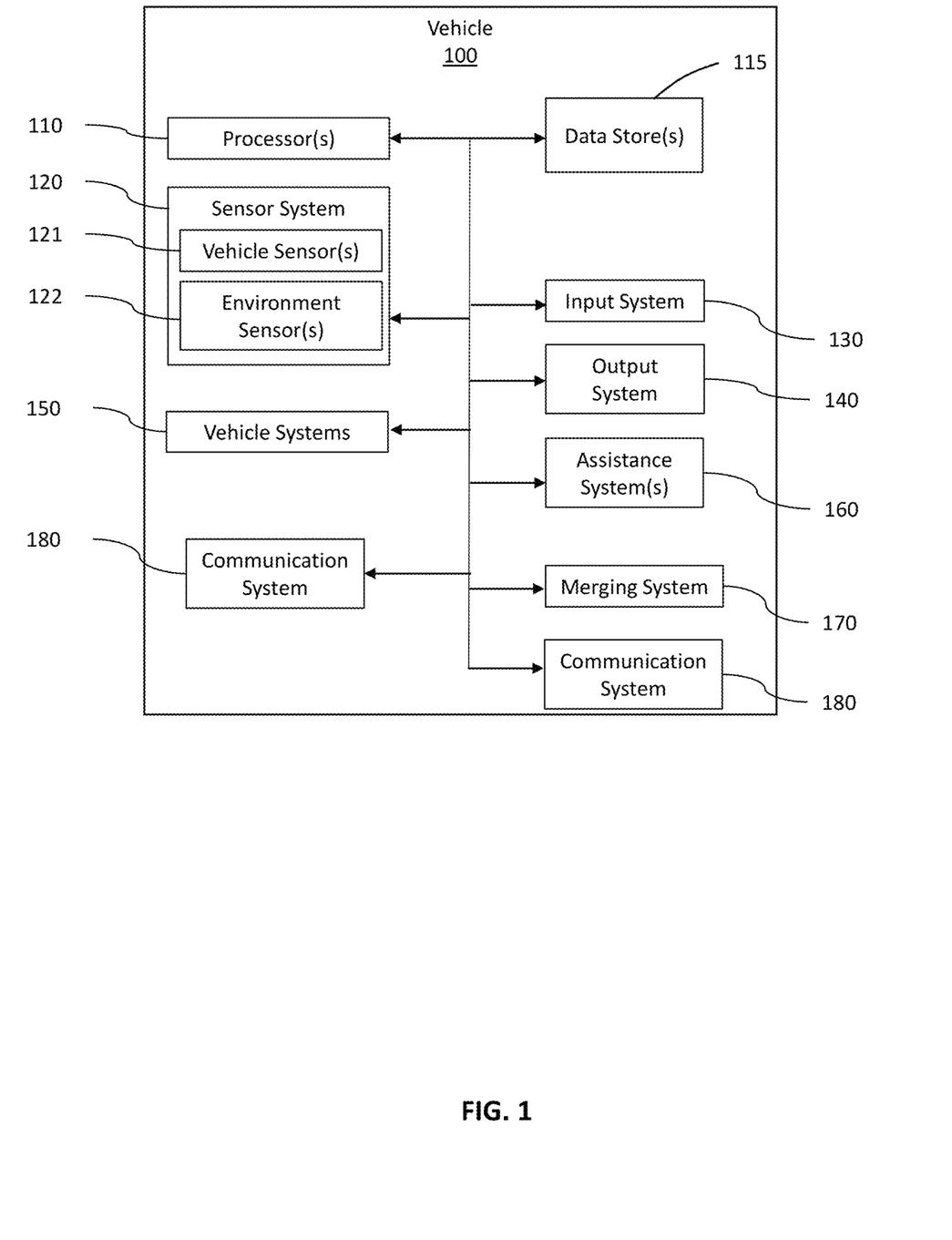
FIG. 1 illustrates one embodiment of a configuration of a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that, for example, travels on multi-lane roadways with other vehicles, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a merging system 170 that functions to improve behavior planning (i.e., trajectory generation) in relation to circumstances involving undertaking maneuvers. Moreover, while depicted as a standalone component, in one or more embodiments, the merging system 170 is integrated with the assistance system 160, or another similar system of the vehicle 100 to facilitate functions of the other systems/modules. The noted functions and methods will become more apparent with a further discussion of the figures.

Furthermore, the assistance system 160 may take many different forms but generally provides some form of automated assistance to an operator of the vehicle 100. For example, the assistance system 160 may include various advanced driving assistance system (ADAS) functions, such as a lane-keeping function, adaptive cruise control, collision avoidance, emergency braking, and so on. In further aspects, the assistance system 160 may be a semi-autonomous or fully autonomous system that can partially or fully control the vehicle 100. Accordingly, the assistance system 160, in whichever form, functions in cooperation with sensors of the sensor system 120 to acquire observations about the surrounding environment from which additional determinations can be derived in order to provide the various functions. Moreover, while the merging system 170 is generally discussed in relation to the assistance system 160, the merging system 170, in at least one configuration, may provide control support without directly causing lateral or longitudinal control of the vehicle. That is, the merging system 170 may instead provide warnings, alerts, visual guidance, or other non-invasive assistance to improve behaviors of the ego vehicle 100.

As a further aspect, the vehicle 100 also includes a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via short-range communications such as a Bluetooth, WiFi, or another suitable protocol for communicating between the vehicle 100 and other nearby devices (e.g., other vehicles). Moreover, the communication system 180, in one arrangement, further communicates according to a long-range protocol, such as the global system for mobile communication (GSM), Enhanced Data Rates for GSM Evolution (EDGE), or another communication technology that provides for the vehicle 100 communicating with a cloud-based resource. In either case, the system 170 can leverage various wireless communications technologies to facilitate communications with nearby vehicles (e.g., vehicle-to-vehicle (V2V)), nearby infrastructure elements (e.g., vehicle-to-infrastructure (V2I)), and so on. For example, in one or more arrangements, a nearby vehicle may communicate an intent to merge into a lane of the ego vehicle 100 without displaying an active blinker. In this way, the ego vehicle 100 acquires information about a state of the nearby vehicle without leveraging direct observations through the sensor data.

Figure 2:
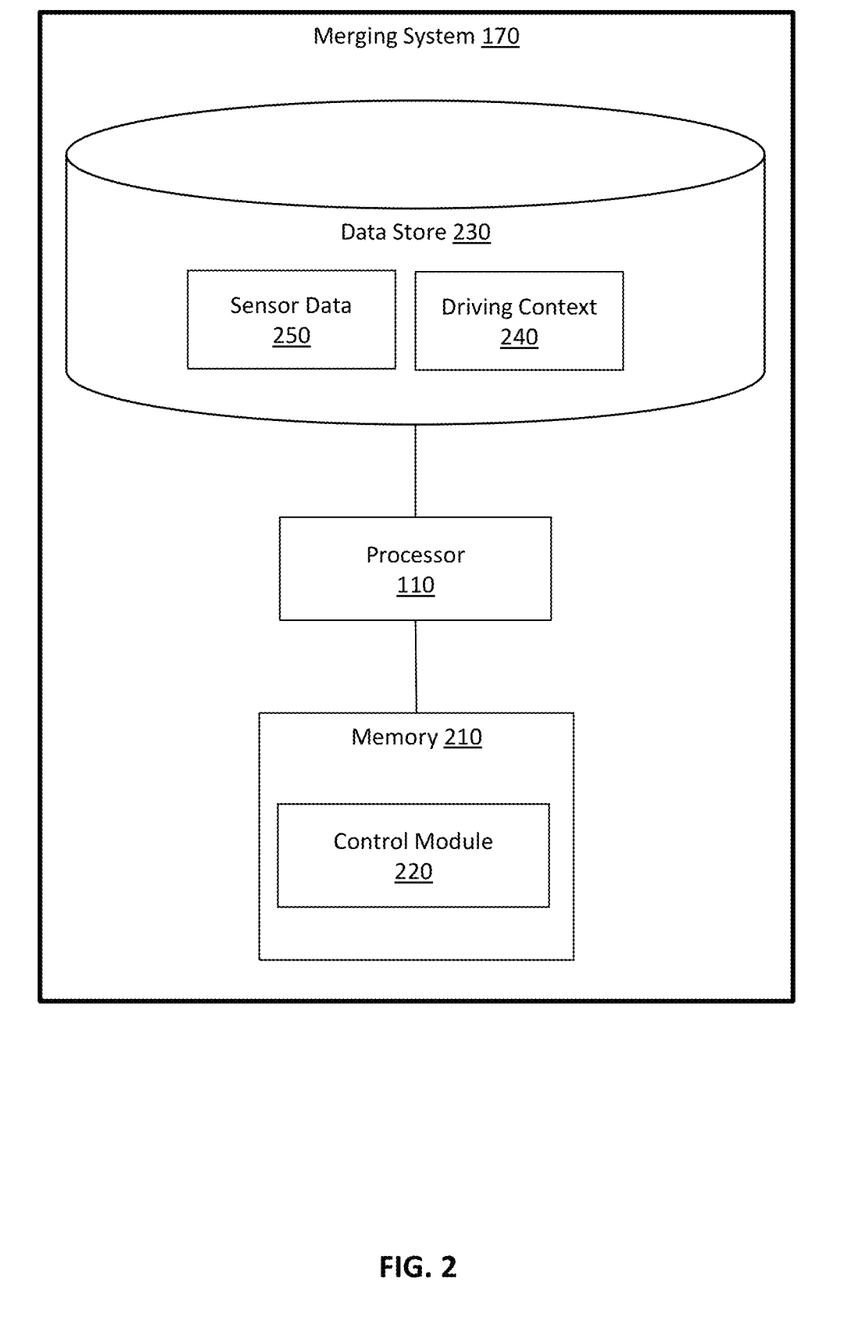
FIG. 2 illustrates one embodiment of a merging system that is associated with adaptively generating trajectories for a vehicle to avoid undertaking maneuvers.

With reference to FIG. 2, one embodiment of the merging system 170 is further illustrated. As shown, the merging system 170 includes a processor 110. Accordingly, the processor 110 may be a part of the merging system 170, or the merging system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the merging system 170.

In one embodiment, the merging system 170 includes a memory 210 that stores the control module 220. The memory 210 is a random-access memory (RAM), read-only memory (ROM), a hard disk drive, a flash memory, or other suitable memory for storing the module 220. The module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware such as processing components (e.g., controllers), circuits, etc. for independently performing one or more of the noted functions.

Furthermore, in one embodiment, the merging system 170 includes a data store 230. The data store 230 is, in one arrangement, an electronically-based data structure for storing information. For example, in one approach, the data store 230 is a database that is stored in the memory 210 or another suitable medium, and that is configured with routines that can be executed by the processor 110 for analyzing stored data, providing stored data, organizing stored data, and so on. In any case, in one embodiment, the data store 230 stores data used by the module 220 in executing various functions. In one embodiment, the data store 230 includes driving context 240, and sensor data 250 along with, for example, other information that is used by the control module 220.

Accordingly, the control module 220 generally includes instructions that function to control the processor 110 to acquire data inputs from one or more sensors of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is traveling or parked.

While the control module 220 is discussed as controlling the various sensors to provide the sensor data 250, in one or more embodiments, the control module 220 can employ other techniques to acquire the sensor data 250 that are either active or passive. For example, the control module 220 may passively sniff the sensor data 250 from a stream of electronic information provided by the various sensors to further components within the vehicle 100. Moreover, the control module 220 can undertake various approaches to fuse data from multiple sensors when providing the sensor data 250. Thus, the sensor data 250, in one embodiment, represents a combination of perceptions acquired from multiple sensors and/or other aspects of the vehicle 100. For example, in a further configuration, the sensor data 250 may include information acquired via the communication system 180, such as data from other vehicles and/or infrastructure devices about the average speed of traffic.

Whether the sensor data 250 is derived from a single sensor, multiple sensors, or is acquired through other means, the sensor data 250 is comprised of various information that facilitates the control module 220 with determining the driving context 240, a vehicle state for a nearby vehicle, and so on. Moreover, the sensor data 250 and the driving context 240 include an assessment of the surrounding environment around the ego vehicle 100 including, in at least one approach, 360-degrees about the ego vehicle 100. In this way, the driving context 240 not only assesses the area ahead of the ego vehicle 100 but to the sides and behind in order to account for traffic and/or other hazards that may interfere with adjusting a trajectory of the vehicle 100.

The control module 220 analyzes the sensor data 250 to determine the driving context 240. In various approaches, the control module 220 implements machine learning algorithms (e.g., deep neural networks, such as convolutional neural networks (CNNs)), policies, heuristics, and other processing mechanisms to analyze the sensor data 250 and derive the driving context 240 and other useful information therefrom (e.g., vehicle states). The driving context 240 generally defines a type of the roadway on which the ego vehicle 100 is traveling along with other aspects of the surrounding environment, such as the presence of nearby vehicles, states of the nearby vehicles, classes of the vehicles, and so on. In regards to the type of the roadway, the driving context 240 indicates a number of lanes, types of the lanes (e.g., passing lane, travel lane, exit lane, etc.), highway or urban setting, and so on.

It should be noted that as used within this disclosure, an inside lane is considered to be a travel lane (also referred to as a slow lane), whereas a passing lane (also referred to as a fast lane) is instead generally used for passing/overtaking other vehicles. Moreover, the particular orientation of these lanes may vary depending on the driving conventions of a particular country (e.g., right-hand traffic versus left-hand traffic). By way of example, in countries with right-hand traffic (e.g., the United States), passing lanes are to the left while travel lanes are to the right. In the instance of a multi-lane road with two lanes of traffic in the same direction, a left or outside lane is the passing lane, whereas the right or inside lane is the travel/slow lane. In circumstances where the number of lanes exceeds two in a particular direction, this usage is generally applied relative to positions of the vehicles. That is, relative to the nearby vehicle that is being passed, a lane to the right is an inside lane, which may be referred to as slow lane, and a lane to the left is an outside lane or passing lane. Of course, in instances of the nearby vehicle being in a left-most lane, the nearby vehicle is traveling in the outside/passing lane, and the inside/slow lane may be the only option for passing, which is an undertaking maneuver. In the instance of left-hand traffic, the stated configurations are simply swapped.

In any case, the control module 220 acquires the sensor data 250 and generates the driving context in order to assess the surrounding environment. As a further aspect of generating the driving context 240, the control module 220 further determines a vehicle state for any nearby vehicle. The vehicle state indicates the position, class size, lane change status, and other aspects of the nearby vehicle (e.g., trajectory, etc.). The position is generally the lane position and a distance from the ego vehicle 100. The class size indicates how large the nearby vehicle is with particular emphasis on the length. As noted previously, because vehicles with longer lengths are associated with increased risks of undertaking maneuvers, the control module 220 classifies the nearby vehicle to quantify the length and thus the risk of the undertaking maneuver.

The class of the vehicle is the rating assigned based on gross vehicular weight (GVWR), which generally corresponds to vehicle length. Thus, the control module 220 may classify the nearby vehicle according to a standard, such as the Federal Highway Administration (FHWA) vehicle classification, which defines vehicles from class 1 to 13. The classes include class 1—motorcycles, class 2—passenger cars, class 3—pick-up trucks/vans, class 4—buses, class 5—two-axle trucks, and so on. Thus, vehicles having a class rating above 4 are generally vehicles having a greater length. Of course, while the control module 220 may apply the class rating, the control module 220, in an alternative or additional arrangement, may determine the length of the vehicle 100 separately. However, this determination may be difficult depending on traffic and an ability to observe the nearby vehicle. Thus, the control module 220 can apply the class rating according to, for example, estimates of the particular type of vehicle without a precise determination of length.

In any case, the control module 220 uses the driving context 240 to determine how to plan a trajectory for the ego vehicle 100. As the ego vehicle 100 is traveling, the control module 220 identifies a nearby vehicle and determines the driving context 240 to assess whether an undertaking maneuver will occur should the vehicle 100 proceed. That is, when the control module 220 identifies that the ego vehicle 100 is traveling on a multi-lane road with a nearby vehicle to an outside lane, the control module 220 then further assesses whether to proceed or adjust a trajectory to avoid an undertaking maneuver.

Thus, the control module 220, in one or more configurations, determines whether the driving context 240 and a vehicle state of the nearby vehicle satisfy a merge threshold to determine how to proceed. For example, the merge threshold, in one or more arrangements, defines base values for various aspects of the circumstance beyond which the control module 220 modifies the trajectory of the ego vehicle 100 to avoid an undertaking maneuver. As such, the merge threshold generally defines aspects of the driving context 240, such as a multi-lane roadway that is either urban or highway, a relative position of the nearby vehicle to the ego vehicle 100 among lanes of the multi-lane roadway (e.g., to an adjacent outside lane), a length of the nearby vehicle (i.e., class 4 or greater) and further characteristics that indicate whether the nearby vehicle is or is likely to merge back to the lane of the ego vehicle 100.

The further characteristics may include the nearby vehicle reducing speed, activating a turn signal toward a lane of the ego vehicle 100, and/or providing a communication via V2V or another communication mechanism to the ego vehicle 100 about an intent to change lanes. Accordingly, in response to determining that the driving context 240 and the state of the nearby vehicle satisfy the merge threshold (i.e., that the ego vehicle 100 is in a circumstance associated with an undertaking maneuver and the nearby vehicle intends to change lanes), then the control module 220 generates a trajectory for the ego vehicle that modifies a current path.

In one approach, the control module 220 generates the trajectory to provide a gap for the nearby vehicle to merge in front of the ego vehicle 100. Thus, the control module 220 may generate the trajectory to initially slow the ego vehicle 100 in order to provide a gap into which the nearby vehicle will fit according to a length of the nearby vehicle. Accordingly, the control module 220 may use the class determination or an explicit determination of the length of the nearby vehicle in order to determine the gap size. In this way, the nearby vehicle is able to merge back into the travel lane, and the control module 220 can further generate the trajectory to perform a lane change either before or after the nearby vehicle merges so that the ego vehicle 100 can perform an overtaking maneuver instead of an undertaking maneuver, thereby improving safety.

Once the control module 220 generates the trajectory, the control module 220, in one approach, implements the trajectory to control the ego vehicle 100 by generating longitudinal and lateral controls that cause the ego vehicle to follow the trajectory (e.g., via the assistance system 160). Of course, in instances where the ego vehicle is not fully or semi-autonomous, the control module 220 may instead provide instructions to an operator via a heads-up display or another human-machine interface (HMI) to facilitate implementation of the trajectory.

Figure 3:
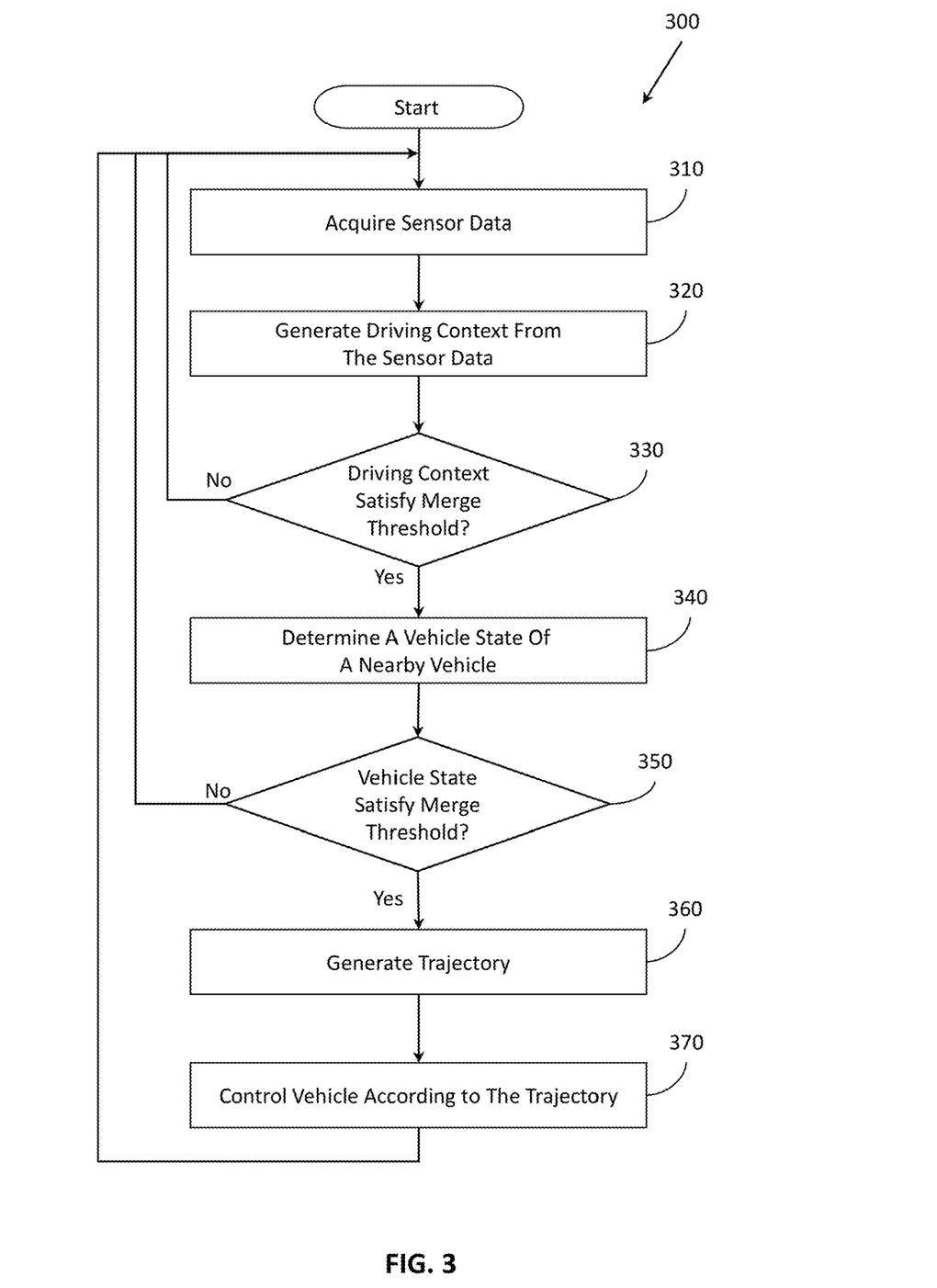
FIG. 3 illustrates one embodiment of a method associated with planning maneuvers of a vehicle.

Additional aspects of providing cooperative control according to system conditions of a vehicle will be discussed in relation to FIG. 3. FIG. 3 illustrates a method 300 associated with planning maneuvers of a vehicle. Method 300 will be discussed from the perspective of the merging system 170 of FIG. 1. While method 300 is discussed in combination with the merging system 170, it should be appreciated that the method 300 is not limited to being implemented within the merging system 170 but is instead one example of a system that may implement the method 300.

At 310, the control module 220 acquires the sensor data 250. In one embodiment, acquiring the sensor data 250 includes controlling one or more sensors of the vehicle 100 to generate observations about the surrounding environment of the vehicle 100. The control module 220, in one or more implementations, iteratively acquires the sensor data 250 from one or more sensors of the sensor system 120. The sensor data 250 includes observations of a surrounding environment of the ego vehicle 100, including specific regions that are relevant to identifying nearby vehicles and aspects relating to avoiding undertaking maneuvers. Moreover, the sensor data 250 further includes information about traffic and other hazards that are relevant to generating a trajectory of the vehicle 100 so that the vehicle 100 can determine the trajectory for a lane change maneuver without, for example, colliding with other vehicles or encountering other difficulties.

At 320, the control module 220 determines the driving context 240. In one arrangement, the control module 220 determines the driving context 240 by analyzing the sensor data 250 to determine a configuration of the lanes of the roadway and the position of the ego vehicle 100 among the lanes. As a further aspect, the control module 220 can also determine a vehicle state of one or more nearby vehicles. The vehicle state identifies the nearby vehicle(s) and whether the nearby vehicle(s) is/are at least class 4 vehicle(s), as previously noted. In further aspects, the vehicle state also indicates trajectories, turn signal states, and so on.

At 330, the control module 220 determines whether the driving context 240 satisfies the merge threshold. In one approach, the control module 220 initially determines whether the driving context 240 satisfies general conditions of the merge threshold, such as whether the roadway is a multi-lane road (e.g., at least two lanes in the same direction), and whether the nearby vehicle is positioned in an adjacent outside lane. When the noted conditions are satisfied, then the control module 220 may continue at 340 by determining the state of the nearby vehicle. Otherwise, the control module 220 proceeds to acquire the sensor data 250 at 310 and repeat the noted functions.

At 340, the control module 220 may further determine the vehicle state of the nearby vehicle. The control module 220 may determine the vehicle state as part of the driving context 240 or separately upon determining the driving context satisfies the merge threshold. In any case, the vehicle state defines aspects specific to the nearby vehicle that is subject to the undertaking maneuver. For example, in one configuration, the control module 220 determines indicators about whether the nearby vehicle is attempting to merge into a lane of the ego vehicle 100. The indicators may include the nearby vehicle slowing, the nearby vehicle activating a turn signal, a lateral trajectory associated with a lane change, and so on. Furthermore, as part of the vehicle state, the control module 220 may also identify a length and/or a class of the nearby vehicle.

At 350, the control module 220 determines whether the vehicle state satisfies the merge threshold. In one arrangement, the control module 220 determines whether a class of the nearby vehicle is at least a size class 4. In other words, the control module 220 determines whether a length of the nearby vehicle exceeds the merge threshold (e.g., greater than 25 ft.). As a further aspect of determining whether the vehicle state satisfies the merge threshold, the control module 220 may determine whether the nearby vehicle intends to change lanes. In one arrangement, the control module 220 determines the intent about changing lanes according to the characteristics noted above, such as a turn signal, trajectory, V2V communication, and so on. Thus, if the vehicle state exhibits the noted characteristics in regards to class/length and intent to change lanes, then the control module 220 determines that the vehicle state satisfies the merge threshold and continues with generating the trajectory at 360. Otherwise, the control module restarts the method 300.

At 360, the control module 220 generates a trajectory for the ego vehicle 100 that avoids undertaking the nearby vehicle. In at least one arrangement, generating the trajectory includes determining a length of the nearby vehicle and generating the trajectory with a gap in front of the ego vehicle 100 that provides for the length and into which the nearby vehicle can merge. The control module 220 may already be aware of the length from prior determinations or control module 220 can actively determine the length/size as previously mentioned. In yet a further aspect, the control module 220 generates the trajectory with a lane change maneuver to an adjacent lane in which the nearby vehicle was/is traveling while maintaining a gap in a current lane for the nearby vehicle. Generating the trajectory with the lane change maneuver may also include identifying traffic that may affect the lane change (e.g., traffic approaching from the rear) in order to adjust speeds/timing of the lane change.

At 370, the control module 220 controls the ego vehicle according to the trajectory. In one arrangement, the control module 220 provides a control input to the ego vehicle 100 to control a path of the ego vehicle 100 according to the trajectory. The assistance system 160 may originate the controls according to a request from the control module 220 according to the trajectory. The controls may vary depending on the particular mode of the ego vehicle 100 (e.g., autonomous, semi-autonomous, etc.), but can include lateral controls to cause the vehicle 100 to follow the trajectory, provide automatic braking/accelerating, and so on. In this way, the merging system 170 avoids safety risks by avoiding undertaking maneuvers.

Figure 4:
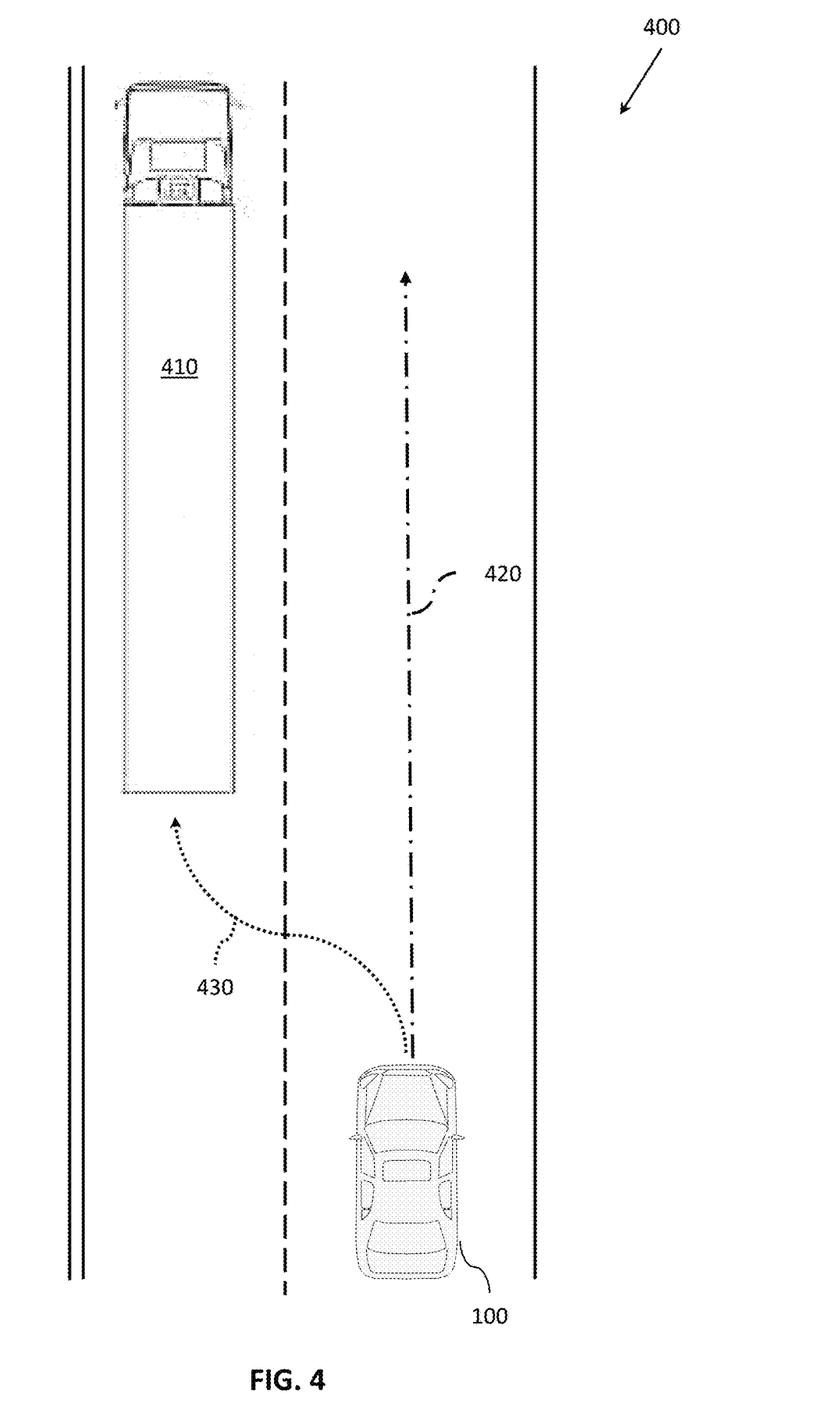
FIG. 4 illustrates one example of a driving context including a lorry and an ego vehicle.

As a further explanation of how the presently disclosed systems and methods function, consider FIG. 4. FIG. 4 illustrates a multi-lane roadway 400, which may be a highway or an urban surface street with multiple lanes. As shown, the ego vehicle 100 is traveling in a traveling lane to the inside of a lorry 410 that is in a passing/fast lane. Accordingly, the ego vehicle 100 is presently on a trajectory 420 that is an undertaking maneuver. However, the merging system 170 recognizes the driving context 240 includes a multi-lane road with a nearby vehicle in an outside adjacent lane, which corresponds with the noted approach. Thus, as the ego vehicle 100 approaches, the merging system 170 may further determine that the lorry 410 satisfies the class indicated by the merge threshold and also that the lorry intends to merge to the lane of the ego vehicle 100. As such, the merging system 170 generates a trajectory 430 that provides a gap for the lorry 410 to merge and also for the ego vehicle 100 to perform a lane change so that the ego vehicle 100 can overtake the lorry 410 once the lorry 410 merges. In this way, the ego vehicle 100 improves safety while also potentially improving traffic flow by permitting the lorry 410 to change lanes.

Additionally, it should be appreciated that the merging system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the merging system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the merging system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the merging system 170, and/or the assistance system 160 may control some or all of these vehicle systems 150 and, thus, may be partially or fully autonomous.

The processor(s) 110, the merging system 170, and/or the assistance system 160 can be operatively connected to communicate with the various vehicle systems 150 and/or individual components thereof. For example, returning to FIG. 1, the processor(s) 110, the merging system 170, and/or the assistance system 160 can be in communication to send and/or receive information from the various vehicle systems 150 to control the movement, speed, maneuvering, heading, direction, etc. of the vehicle 100. The processor(s) 110, the merging system 170, and/or the assistance system 160 may control some or all of these vehicle systems 150.

The processor(s) 110, the merging system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the merging system 170, and/or the assistance system 160 can control the direction and/or speed of the vehicle 100. The processor(s) 110, the merging system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the merging system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the merging system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A merging system, comprising:
one or more processors; and
a memory communicably coupled to the one or more processors and storing:
a control module including instructions that, when executed by the one or more processors cause the one or more processors to:
generate a driving context from sensor data about a surrounding environment of an ego vehicle, the driving context identifying lanes of a roadway and a position of the ego vehicle in the lanes;
in response to determining that the driving context and a state of a nearby vehicle satisfy a merge threshold, generate a trajectory for the ego vehicle that avoids undertaking the nearby vehicle, including determining a length of the nearby vehicle and generating the trajectory with a gap in front of the ego vehicle that provides for the length and into which the nearby vehicle can merge; and
control the ego vehicle according to the trajectory.

2. The merging system of claim 1, wherein the control module includes instructions to generate the trajectory including instructions to generate the trajectory with a lane change maneuver to an adjacent lane of the nearby vehicle while maintaining a gap in a current lane for the nearby vehicle.

3. The merging system of claim 1, wherein the control module includes instructions to generate the driving context including instructions to analyze the sensor data to determine a configuration of the lanes of the roadway and the position of the ego vehicle among the lanes.

4. The merging system of claim 1, wherein the control module includes instructions to determine that the driving context satisfies the merge threshold including instructions to identify that the position of the ego vehicle is in a travel lane of the roadway with at least one passing lane to an outside position of the ego vehicle.

5. The merging system of claim 1, wherein the control module includes instructions to determine that the state of the nearby vehicle satisfies the merge threshold including instructions to identify a class of the nearby vehicle is at least a size class 4 and that the nearby vehicle is traveling in an adjacent outside lane.

6. The merging system of claim 1, wherein the control module includes instructions to generate the driving context including instructions to identify the nearby vehicle and that the nearby vehicle is at least a class 4 vehicle.

7. The merging system of claim 1, wherein the control module includes instructions to acquire, using at least one sensor, the sensor data about the surrounding environment of the ego vehicle, and
wherein the control module includes instructions to control the ego vehicle according to the trajectory by generating longitudinal and lateral controls that cause the ego vehicle to follow the trajectory.

8. A non-transitory computer-readable medium storing instructions that, when executed by one or more processors, cause the one or more processors to:
generate a driving context from sensor data about a surrounding environment of an ego vehicle, the driving context identifying lanes of a roadway and a position of the ego vehicle in the lanes;
in response to determining that the driving context and a state of a nearby vehicle satisfy a merge threshold, generate a trajectory for the ego vehicle that avoids undertaking the nearby vehicle, including determining a length of the nearby vehicle and generating the trajectory with a gap in front of the ego vehicle that provides for the length and into which the nearby vehicle can merge; and
control the ego vehicle according to the trajectory.

9. The non-transitory computer-readable medium of claim 8, wherein the instructions to generate the trajectory include instructions to generate the trajectory with a lane change maneuver to an adjacent lane of the nearby vehicle while maintaining a gap in a current lane for the nearby vehicle.

10. The non-transitory computer-readable medium of claim 8, wherein the instructions to generate the driving context include instructions to analyze the sensor data to determine a configuration of the lanes of the roadway and the position of the ego vehicle among the lanes.

11. A method, comprising:
generating a driving context from sensor data about a surrounding environment of an ego vehicle, the driving context identifying lanes of a roadway and a position of the ego vehicle in the lanes;
in response to determining that the driving context and a state of a nearby vehicle satisfy a merge threshold, generating a trajectory for the ego vehicle that avoids undertaking the nearby vehicle, including determining a length of the nearby vehicle and generating the trajectory with a gap in front of the ego vehicle that provides for the length and into which the nearby vehicle can merge; and
controlling the ego vehicle according to the trajectory.

12. The method of claim 11, wherein generating the trajectory includes generating the trajectory with a lane change maneuver to an adjacent lane of the nearby vehicle while maintaining a gap in a current lane for the nearby vehicle.

13. The method of claim 11, wherein generating the driving context includes analyzing the sensor data to determine a configuration of the lanes of the roadway and the position of the ego vehicle among the lanes.

14. The method of claim 11, wherein determining that the driving context satisfies the merge threshold includes identifying that the position of the ego vehicle is in a travel lane of the roadway with at least one passing lane to an outside position of the ego vehicle.

15. The method of claim 11, wherein determining that the state of the nearby vehicle satisfies the merge threshold includes identifying a class of the nearby vehicle is at least a size class 4 and that the nearby vehicle is traveling in an adjacent outside lane.

16. The method of claim 11, wherein generating the driving context includes identifying the nearby vehicle and that the nearby vehicle is at least a class 4 vehicle.

17. The method of claim 11, further comprising:
acquiring, using at least one sensor, the sensor data about the surrounding environment of the ego vehicle,
wherein controlling the ego vehicle according to the trajectory includes generating longitudinal and lateral controls that cause the ego vehicle to follow the trajectory.

* * * * *